(12) United States Patent
Zhou et al.

(10) Patent No.: US 8,121,065 B2
(45) Date of Patent: Feb. 21, 2012

(54) TDMA CONTROLLER FOR A WIRELESS COMMUNICATION SYSTEM AND METHOD OF OPERATING SAME

(75) Inventors: Xuan Zhou, Shanghai (CN); Shiyi Zhu, Shanghai (CN); Robin Zhang, Fremont, CA (US); Jun Yin, Shanghai (CN)

(73) Assignee: Marvell World Trade Ltd., St. Michael (BB)

( * ) Notice: Subject to any disclaimer, the term of this patent is extended or adjusted under 35 U.S.C. 154(b) by 1109 days.

(21) Appl. No.: 11/546,671

(22) Filed: Oct. 12, 2006

(65) Prior Publication Data

US 2007/0177515 A1 Aug. 2, 2007

Related U.S. Application Data

(60) Provisional application No. 60/766,591, filed on Jan. 30, 2006.

(51) Int. Cl.
*H04W 4/00* (2009.01)
(52) U.S. Cl. .......................... 370/314; 370/347
(58) Field of Classification Search .................. 370/345, 370/347, 350, 229, 230, 230.1, 231, 314, 370/329, 328, 337
See application file for complete search history.

(56) References Cited

U.S. PATENT DOCUMENTS

| | | | | |
|---|---|---|---|---|
| 5,379,326 A * | 1/1995 | Nakahara et al. | ............. | 375/354 |
| 5,694,392 A * | 12/1997 | Gaglione et al. | ............. | 370/337 |
| 5,898,925 A * | 4/1999 | Honkasalo et al. | ........... | 455/437 |
| 5,982,294 A | 11/1999 | Takayama et al. | | |
| 6,621,806 B1 * | 9/2003 | Keller et al. | .................. | 370/329 |
| 7,386,081 B2 * | 6/2008 | Yamazaki | ..................... | 375/368 |
| 2003/0185166 A1 * | 10/2003 | Belcea | ......................... | 370/321 |
| 2003/0206243 A1 | 11/2003 | Kizu | | |
| 2004/0105419 A1 * | 6/2004 | Kasamura | ..................... | 370/345 |
| 2007/0116163 A1 * | 5/2007 | Nishimura et al. | ........... | 375/350 |

FOREIGN PATENT DOCUMENTS

EP  1 469 606  10/2004

OTHER PUBLICATIONS

PCT International Search Report and Written Opinion dated Jul. 4, 2007 for International Application No. PCT/US2007/000360; 15 pages.
U.S. Appl. No. 11/442,838, filed May 30, 2006, Wang et al.

* cited by examiner

*Primary Examiner* — Gary Mui

(57) ABSTRACT

A time division multiple access (TDMA) controller and method for operating the same includes a frame position module that generates a frame position signal. The controller also includes a signal module that generates a signal-on signal and a signal-off signal and a comparison module that generates a timing control signal based on the frame position signal, the signal-on signal and the signal-off signal.

39 Claims, 6 Drawing Sheets

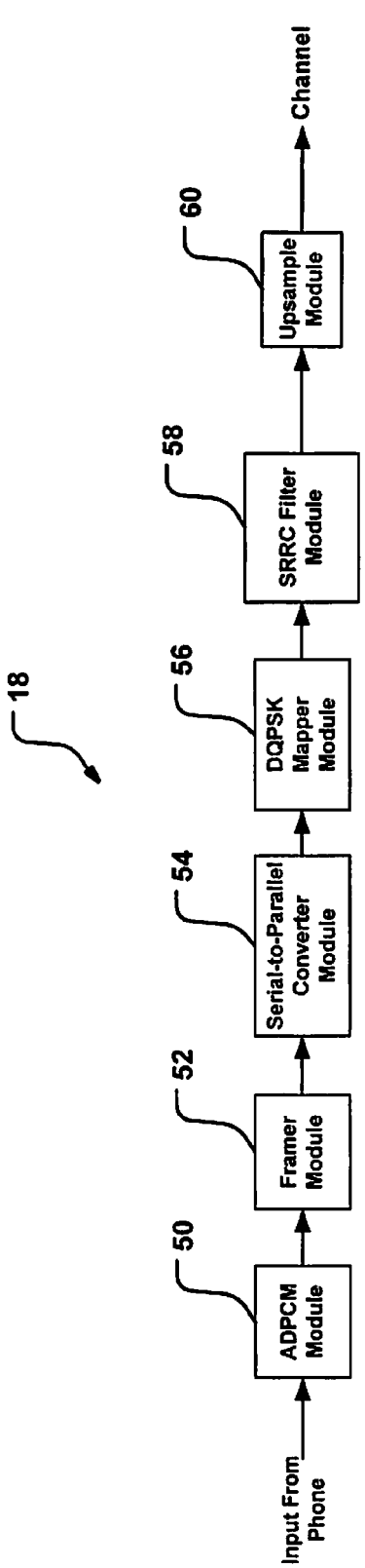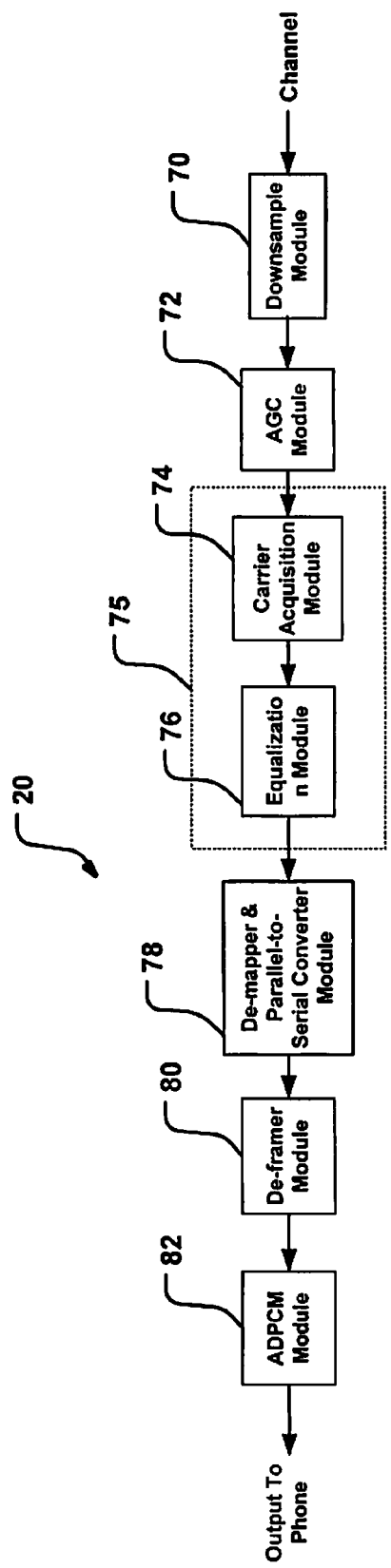
FIG. 2A
Prior Art
FIG. 2B
Prior Art

TDMA CONTROLLER FOR A WIRELESS COMMUNICATION SYSTEM AND METHOD OF OPERATING SAME

CROSS-REFERENCE TO RELATED APPLICATIONS

This application claims the benefit of U.S. Provisional Application No. 60/766,591, filed on Jan. 30, 2006. The disclosure of the above application is incorporated herein by reference in its entirety.

FIELD

The present disclosure relates to communications systems, and more particularly to communications systems and methods for communicating using time division multiple access (TDMA) in a wireless system.

BACKGROUND

The Background description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Communications systems such as cellular systems and wireless systems allow users to transmit and receive data wirelessly between users and/or between users and a cell station. Typically, the cellular and wireless systems must operate at a specific frequency and below a specific power level. Within those constraints, the cellular and wireless systems attempt to maximize data transfer for individual users while accommodating the demands of all of the other users that share the cellular or wireless system. Therefore, each wireless device must wisely use allocated bandwidth to maximize data transfer. Designers of these systems may also be limited by market demands for low cost devices and ongoing cost of operation.

There are a number of approaches that have been developed to maximize the use of the allocated bandwidth while minimizing interference between cellular and wireless users. For example, one approach involves allocating the available bandwidth using time division multiple access (TDMA). TDMA is a digital signal transmission scheme that allows multiple users to access a single radio-frequency (RF) channel. Interference between channels is avoided by allocating unique time slots to each user within each channel. Other approaches include spread spectrum techniques that involve spreading or splitting transmit signals over multiple different frequencies and recombining the signal at a receiver. Spread spectrum approaches typically tend to be more complex and increase the cost of the wireless device and the overall cost of operation.

Various different types of communications systems employ TDMA. For example, cellular systems often use TDMA. One cellular system that uses TDMA is a Personal Handy-phone System (PHS), which is a mobile telephone system that operates in the 1.88-1.93 GHz frequency band. PHS has been popular in markets with strong demand for low cost cellular phones and cost of operation. PHS is a wireless telephone system with capability to handover signals from one cell to another. PHS cells are smaller than cells of cellular phone systems that use Global System for Mobile communication (GSM).

Typically, PHS has a transmission power of 500 mW and a range of 10-100 meters. PHS provides service with minimal congestion in areas of heavy call-traffic such as business districts, downtown, etc. This is accomplished by installing cell stations at a radial distance of every 100-200 meters. Thus, PHS is particularly suitable for use in urban areas.

PHS-based phones can be used in homes, offices, and outdoors. PHS offers a cost-effective alternative to conventional phone systems that use ground lines. Additionally, PHS-based phones can interface with conventional phone systems. Thus, where ground lines of conventional phone systems cannot reach a physical location of a subscriber, the subscriber can use PHS to reach the conventional phone system and establish communication with other subscribers served by the conventional phone system.

PHS uses time division multiple access (TDMA) as radio interface and adaptive differential pulse code modulation (ADPCM) as voice coder-decoder (codec). A codec includes an analog-to-digital converter (ADC) and a digital-to-analog converter (DAC) that translate signals between analog and digital formats. TDMA is a digital signal transmission scheme that allows multiple users to access a single radio-frequency (RF) channel. Interference between channels is avoided by allocating unique time slots to each user within each channel. For example, a PHS frame comprises four channels: one control channel and three traffic channels.

Unlike PCM codecs that quantize speech signals directly, ADPCM codecs quantize a difference between a speech signal and a prediction made of the speech signal. If the prediction is accurate, the difference between actual and predicted speech may have a lower variance than variance in actual speech. Additionally, the difference may be accurately quantized with fewer bits than the number of bits that would be needed to quantize the actual speech. While decoding, a quantized difference signal is added to a predicted signal to reconstruct an original speech signal. The performance of the codec is aided by using adaptive prediction and quantization so that a predictor and a difference quantizer adapt to changing characteristics of speech being coded.

Referring now to FIG. 1, a PHS phone system includes a PHS phone 10 with an antenna 12 and a cell station 11 having an antenna 13. An exemplary PHS phone 10 comprises a signal processing module 16 including a transmit module 18 and a receive module 20, memory 22, a power supply 24, and an I/O module 26. The I/O module 26 may comprise various user-interfaces such as a microphone 26-1, a speaker 26-2, a display 26-3, a keypad 26-4, a camera 26-5, and the like.

The transmit module 18 converts user input from the microphone 26-1 into PHS-compatible signals. The receive module 20 converts data received from the antenna 12 into a user-recognizable format and outputs the same via speaker 26-2. The signal processing module 16 uses memory 22 to process data transmitted to and received from the antenna 12. The power supply 24 provides power to the phone 10.

Digital data is typically represented by bits. Data is generally transmitted by modulating amplitude, frequency, or phase of a carrier signal with a base-band information-bearing signal. Quadrature phase shift keying (QPSK) is a form of phase modulation generally used in communication systems. In QPSK, information bits are grouped in pairs called dibits. Thus, QPSK uses four symbols that represent dibit values 00, 01, 10, and 11. QPSK maps the four symbols to four fixed phase angles. For example, symbol 00 may be mapped to (+3π/4). On the other hand, π/4-DQPSK uses differential encoding wherein mapping between symbols and phase angle varies. Additionally, π/4-DQPSK maps each of the four symbols to a real and an imaginary phase angle resulting in an eight-point constellation.

Referring now to FIGS. 2A-2B, the transmit module 18 comprises an ADPCM module 50, a framer module 52, a serial-to-parallel converter module 54, a DQPSK mapper module 56, a square-root raised cosine (SRRC) filter module 58, and an upsample module 60. The receive module 20 comprises a downsample module 70, an automatic gain control (AGC) module 72, a demodulator 75 including a carrier acquisition module 74 and an equalization module 76, a de-mapper and parallel-to-serial converter module 78, a de-framer module 80, and an ADPCM module 82.

When transmitting data from the phone 10 on a channel, the ADPCM module 50 converts audio and/or video signal into bits of digital data. The framer module 52 partitions the digital data into frames. The serial-to-parallel converter module 54 converts the bits in the frames into symbols. The DQPSK mapper module 56, which may utilize a modulation scheme such as π/4-DQPSK modulation, maps four real and four imaginary values of four symbols in each frame to a total of eight phase angles and generates a complex baseband signal.

The SRRC filter module 58, which is essentially a Nyquist pulse-shaping filter, limits the bandwidth of the signal. Additionally, the SRRC filter module 58 removes mixer products from the complex baseband signal. The upsample module 60 comprises a quadrature carrier oscillator that is used to convert the phase-modulated baseband signal into a phase-modulated carrier signal. The upsample module 60 transmits the phase-modulated carrier signal on the channel at a sampling frequency that is greater than twice the Nyquist frequency.

When the phone 10 receives a signal from the antenna 12, the downsample module 70 downsamples the signal using an asynchronous oscillator. The downsample module 70 down-converts the signal from the phase-modulated carrier signal to the phase modulated baseband signal. The AGC module 72 maintains the gain of the signal relatively constant despite variation in input signal strength due to transmission losses, noise, interference, etc.

The carrier acquisition module 74 demodulates the signal, retrieves carrier phase information, and decodes symbol values from the signal. The equalization module 76 corrects any distortion present in the signal. The de-mapper and parallel-to-serial converter module 78 de-maps and converts the demodulated signal into a serial bit-stream. The de-framer module 80 de-partitions the frames into digital data bits. The ADPCM module 82 converts the digital data bits into audio and/or video data and outputs the data to the speaker 26-2 and/or the display 26-3 of the phone 10.

Legacy communications systems such as the Personal Handy-phone System (PHS) are configured to be simple and low cost. In PHS TDMA systems, the control circuitry allows every other time slot to be used in the communication process due to imprecise timing matters. Updating a PHS system with improved technology can significantly improve performance.

SUMMARY

In one aspect of the disclosure, a time division multiple access (TDMA) controller includes a frame position module that generates a frame position signal. The controller also includes a signal module that generates a signal-on signal and a signal-off signal and a comparison module that generates a timing control signal based on the frame position signal, the signal-on signal and the signal-off signal.

In a further aspect of the communication system, the frame position module comprises a base counter and the frame position signal comprises a plurality of counter signals. The plurality of counter signals may include an intra-slot counter signal, a slot counter signal, a frame counter signal and/or a multi-frame counter signal.

In a further aspect, a personal station may include the communication system described above and a transceiver that selects communication time slots based on the timing control signal. The transceiver selects adjacent communication time slots based on the timing control signal.

In another aspect, a personal handy phone system may include the personal station described above.

In another aspect, a time division multiple access system may include the communication described above.

In another aspect the communication system may include a signal-on register that selectively generates the signal-on signal and a signal-off register that selectively generates the signal-off signal.

In another aspect of the communication system, the comparison module generates the timing control signal by comparing the frame position signal to the signal-on signal and the signal-off signal.

In another aspect of the communication system, the timing control signal is directed to an on level when the frame position signal reaches the signal-on signal and directed to an off level when the frame position signal reaches the signal-off signal.

In a further aspect of the disclosure, a method of operating a communication system includes generating a frame position signal, generating a signal-on signal and a signal-off signal, and generating a timing control signal based on the frame position signal, the signal-on signal and the signal-off signal.

In one aspect of the method, generating a frame position signal includes generating a plurality of counter signals, an intra-slot counter signal, a slot counter signal, a frame counter signal and/or a multi-frame counter signal.

In another aspect the method includes selecting communication time slots or adjacent communication time slots based on the timing control signal. Generating a timing control signal may include generating the timing control signal by comparing the frame position signal to the signal-on signal and the signal-off signal.

In another aspect, the method may include directing the timing control signal to an on level when the frame position signal reaches the signal-on signal and directing the timing control signal to an off level when the frame position signal reaches the signal-off signal.

In another aspect of the disclosure, a communication system includes a frame position means for generating a frame position signal, a signal means for generating a signal-on signal and a signal-off signal, and a comparison means for generating a timing control signal based on the frame position signal, the signal-on signal and the signal-off signal.

In another aspect, the frame position means includes base counter means and the frame position signal comprises a plurality of counter signals.

In a further aspect, the plurality of counter signals includes an intra-slot counter signal, a slot counter signal, a frame counter signal and/or a multi-frame counter signal.

In a further aspect, a personal station may include the communication system and a transceiver means for selecting communication time slots based on the timing control signal. The transceiver means may include means for selecting adjacent communication time slots based on the timing control signal.

In a further aspect, a personal handy phone system may include the personal station.

In yet another aspect a time division multiple access system may include the communication system.

In another aspect, the signal means includes the signal-on means for selectively generating the signal-on signal, and the signal-off means for selectively generating the signal-off signal.

In a further aspect of the communication system, the comparison means includes means for generating the timing control signal by comparing the frame position signal to the signal-on signal and the signal-off signal.

In a further aspect of the communication system, a control means for directing the timing control signal to an on level when the frame position signal reaches the signal-on signal and to an off level when the frame position signal reaches the signal-off signal.

In yet another aspect of the disclosure, a computer program stored on a tangible computer medium for operating a communication system includes the steps of generating a frame position signal, generating a signal-on signal and a signal-off signal and generating a timing control signal based on the frame position signal, the signal-on signal and the signal-off signal.

In another aspect of the computer program, the step of generating a frame position signal includes the step of generating a plurality of counter signals, the step of generating an intra-slot counter signal, the step of generating a slot counter signal, the step of generating a frame counter signal and/or the step of generating a multi-frame counter signal.

In a further aspect, the computer program includes the step of selecting communication time slots based on the timing control signal or selecting adjacent communication time slots based on the timing control signal.

In a further aspect, the step of generating a timing control signal includes generating the timing control signal by comparing the frame position signal to the signal-on signal and the signal-off signal.

In another aspect, the computer program included the step of directing the timing control signal to an on level when the frame position signal reaches the signal-on signal and directing the timing control signal to an off level when the frame position signal reaches the signal-off signal.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2A is a functional block diagram of an exemplary transmitter used in a PHS phone of FIG. 1 according to the prior art;

FIG. 2B is a functional block diagram of an exemplary receiver used in a PHS phone of FIG. 1 according to the prior art;

DETAILED DESCRIPTION

Figure 1:
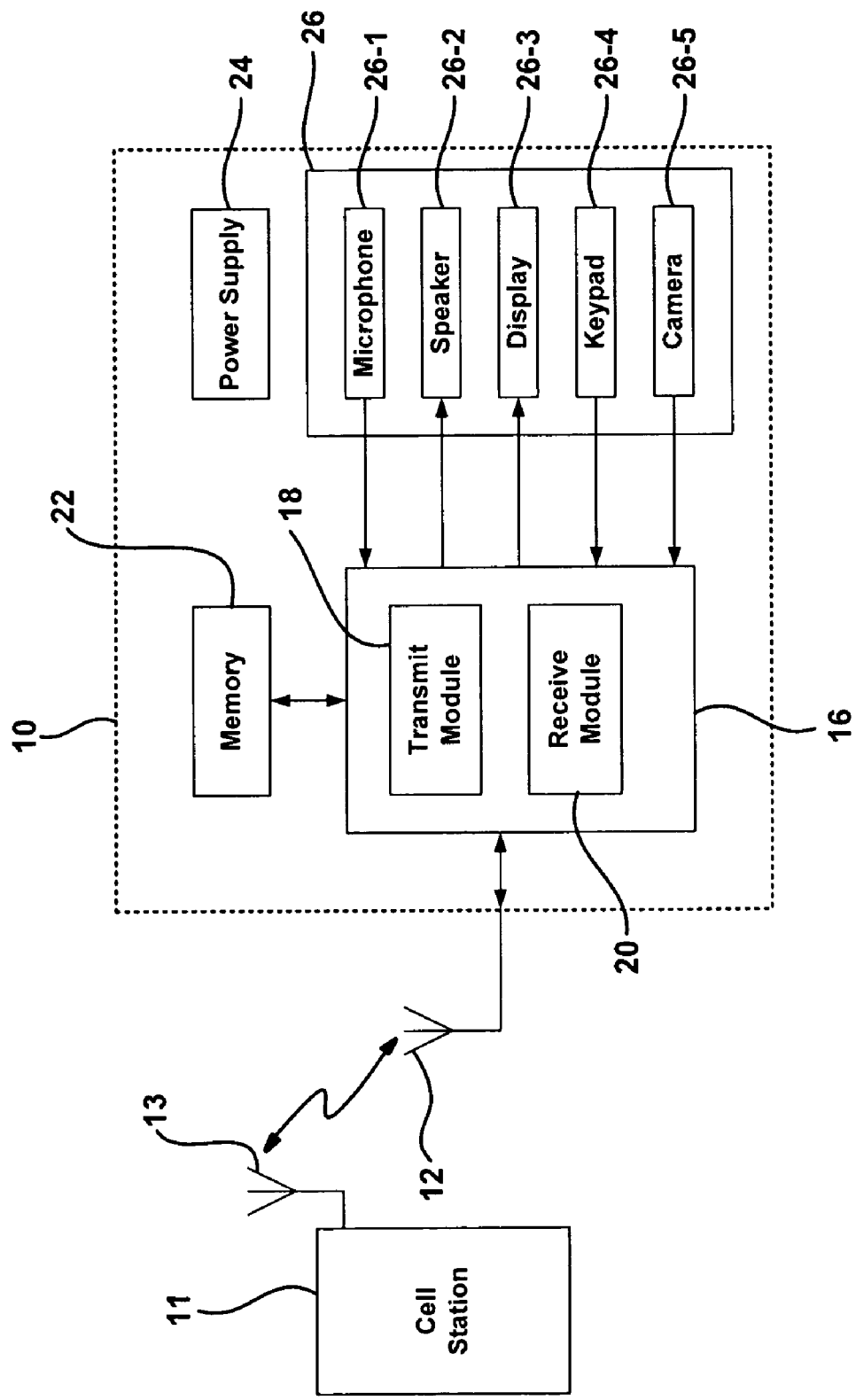
FIG. 1 is a functional block diagram of an exemplary personal handy-phone system (PHS) phone according to the prior art.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure is applicable to communications systems. For example, the present disclosure is applicable to wireless communications systems. The present disclosure is also applicable to time division multiple access (TDMA) systems. In the foregoing description, the present disclosure discusses a personal handy-phone system (PHS). The present disclosure is described below with respect to an exemplary embodiment employed with a PHS communication system and standard (a 2G legacy mobile system). However, the present disclosure is not meant to be limited to PHS systems.

Figure 3:
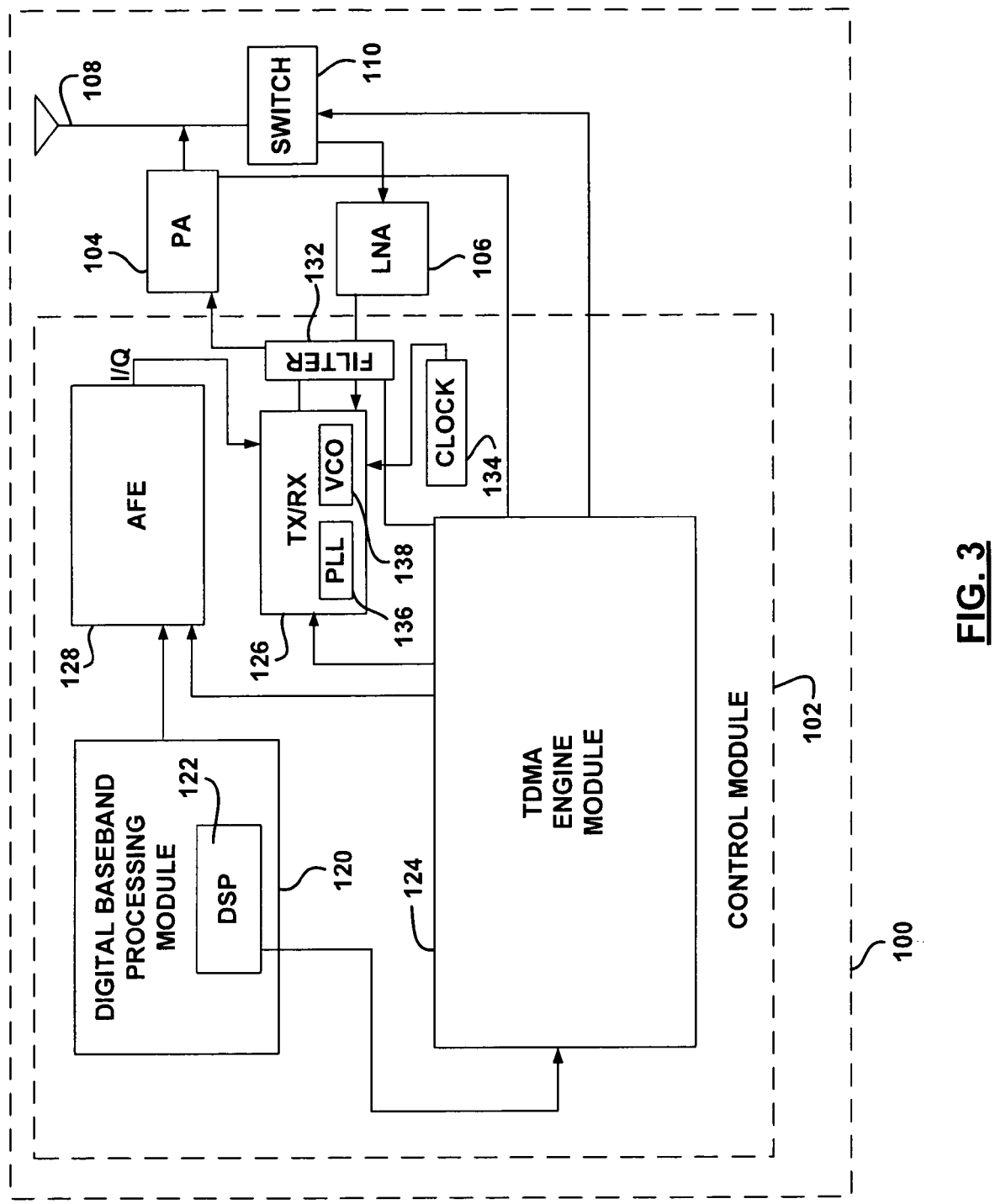
FIG. 3 is a block diagram of the elements employed in the current disclosure.

Referring now to FIG. 3, a block diagram of a portion of a receive data path for a personal station (PS) 100 is illustrated. The personal station 100 includes a control module 102 that communicates with a power amplifier 104 and a low noise amplifier 106. The power amplifier 104 communicates with an antenna 108. The power amplifier 104 amplifies signals to be transmitted by the personal station 102. In a receive mode, a switch 110 controlled by the control module 102, as will be described below, selectively closes the circuit between the low noise amplifier 106 and the antenna 108 so that signals may be received. While the power amplifier 104, low noise amplifier 106 and the switch 100 are shown outside the control module 102, the control module 102 may include these components.

The control module 102 includes a digital baseband processing module 120 which includes a digital signal processor 122. The digital baseband processing module 120 communicates with a time division multiple access (TDMA) engine module 124. The TDMA engine module 124 communicates with a transceiver 126 and any analog front end module (AFE) 128. The analog front end module 128 communicates with the digital baseband processing module 120. The transceiver 126 communicates I and Q data signals to and from the analog front end module 128.

The transceiver 126 receives and transmits communication signals through power amplifier 104 and low noise amplifier 106, respectively. A filter 132 may be used to filter the signals to the power amplifier 104 and filter signal received from the low noise amplifier 106. A clock circuit 134 communicates with the TDMA engine module 124 and the transceiver module 126. As will be described below, the transceiver module 126 may include a phase lock loop module 136 and a voltage controlled oscillator circuit 138.

An exemplary embodiment of a receiver system employing coherent demodulation with adaptive equalization in which the present disclosure may be incorporated as an element is disclosed in co-pending U.S. application Ser. No. 11/442,838, entitled "Method and System for Equalizing Received Signals in a Communications System," which was filed May 30, 2006, the disclosure of which is incorporated by reference as though fully set forth herein.

Figure 4:
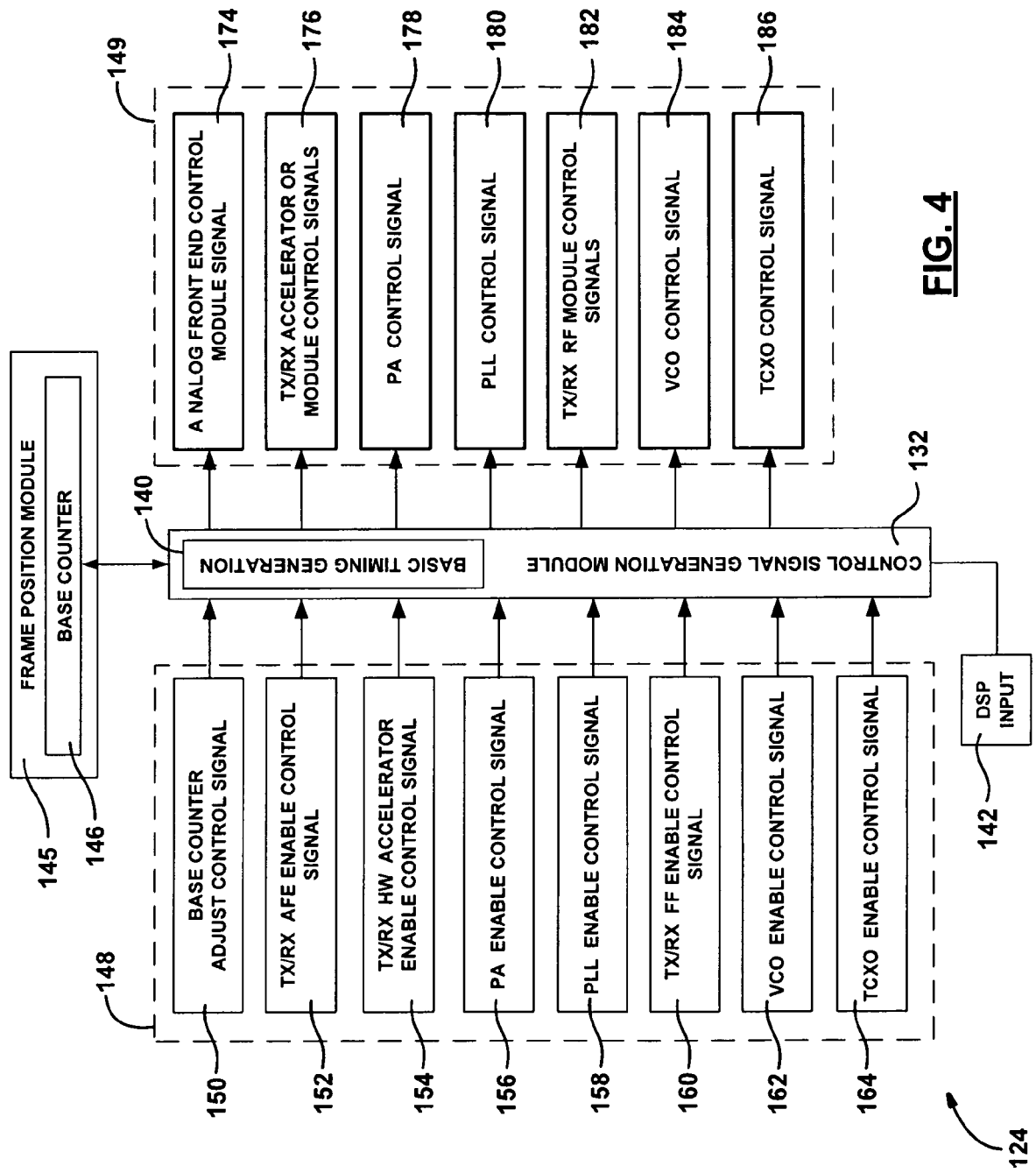
FIG. 4 is a block diagrammatic view of the TDMA engine of FIG. 3.

Referring now to FIG. 4, a block diagrammatic view of the TDMA engine module 124 is illustrated in further detail. The TDMA engine module 124 includes a frame position module 145 having a base counter 146, enable control registers 148 that store incoming control signals and outgoing control signals 149. A control signal generator module 132 generates control signals 149 in response to the base counter 146, the timing associated therewith and the control signals within the enable control registers 148.

The frame position module 145 generates a timing position within the frames of reference. The frame position module 145 generates a relative frame of reference signal. The frame of reference may be determined in the base counter 146. More specifically, the base counter 146 of the frame position module 145 is a time scale that counts according to the data structure for the transmitted and received signals. These include counts for intra-slot, slots, frames and multi-frames within a communication signal. While the present example is set forth with respect to a Personal Handy-phone System, this approach is applicable in other types of communications systems.

The control signal generation module 132 includes a basic timing generation module 140 and a DSP input 142. In response to the DSP input 142 and the counts provided by the base counter 146, the control signals 149 are generated according to a timing control signal generated within the basic timing generation module 140.

The enable control registers 148 receive inputs from various elements and modules within the control module 102 (of FIG. 3). The enable control registers 148 include a base counter adjustment control signal 150, a transceiver (Tx/Rx) analog front end enable control register 152, a transceiver hardware accelerator enable control register 154, a power amplifier enable control register 156, a phase lock loop enable control register 158, a transceiver RF enable control register 160, a voltage controlled oscillator enable control register 162, and a transmit temperature compensation (TCXO) enable control register 164.

The control signals 149 include a transceiver analog front end control module signal 174, a transceiver hardware accelerator module control signal 176, a power amplifier control signal 178, a phase lock loop control signal 180, a transceiver RF module control signal 182, a voltage controlled oscillator control signal 184, and a temperature compensation control signal (TCXO) 186.

The transceiver 126 of FIG. 3 receives the transceiver AFE and hardware accelerator signals 174, 176. The power amplifier control signal 178 is communicated to the power amplifier 104 of FIG. 3. The phase lock loop control signal 180 is communicated to the phase lock loop 136 of FIG. 3. The transceiver RF module control signal 182 is communicated to the transceiver 126. The voltage controlled oscillator control signal 184 is communicated to the voltage control oscillator 138 of FIG. 3. The temperature compensation signal TCXO is coupled to the clock 134 for temperature adjustment of the clock signal.

Figure 5:
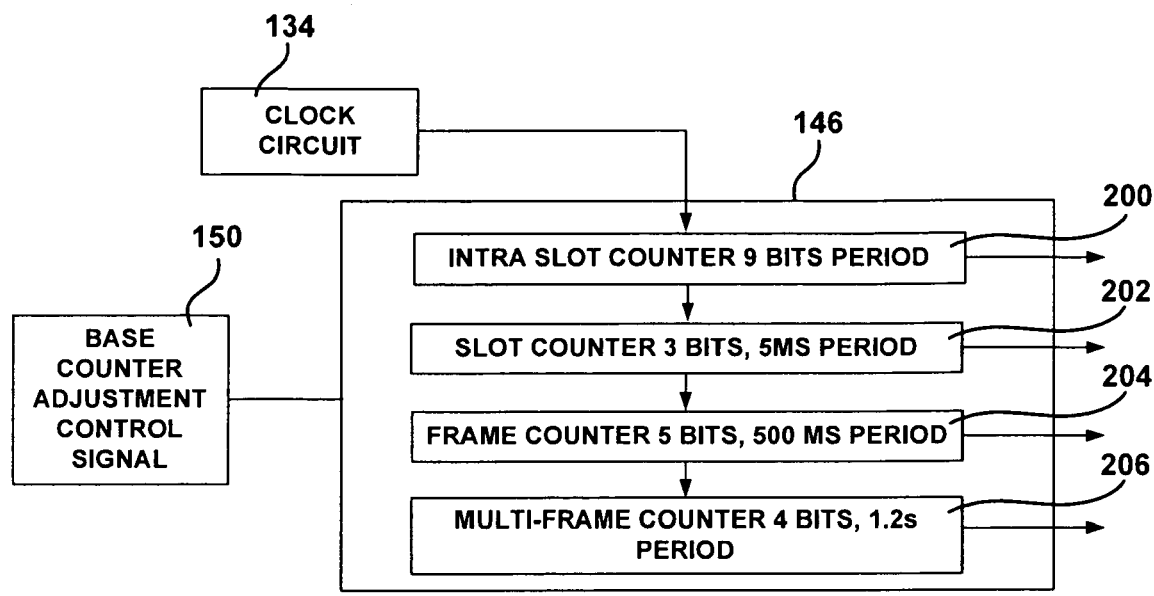
FIG. 5 is a block diagrammatic view of the base counter of FIG. 4.

Referring now to FIG. 5, the base counter 146 is coupled to the clock circuit 134. The clock circuit 134 in the present example is a 576k clock. Those skilled in the art will recognize that other clock speeds may be used.

The base counter 146 includes an intra-slot counter 200, a slot counter 202, a frame counter 204, and a multi-frame counter 206. The counters 200-206 are organized as four stages from low to high. The intra-slot counter 200 has nine bits and a 625 us period. The intra-slot counter 200 provides a time count indicative of the time within the slot. The nine-bit length of the intra-slot counter 200 counts from 0 to 359 and cycles back. It should be noted that in the present example 120 symbols are provided in each slot. With three times over-sampling, 360 samples are provided by the intra-slot counter 200.

The slot counter 202 is a three-bit counter that counts the number of slots. As the intra-slot counter 200 passes its maximum count the slot counter 202 is incremented. The slot counter 202 has a predetermined period such as 5 ms. Because the slot counter 202 is three bits, the slot counter counts from 0 through 7.

Frame counter 204 includes five bits and corresponds to a 100 millisecond period. As the slot counter 202 is increased beyond its maximum count, the frame counter 204 is incremented.

The multi-frame counter 206 includes four bits and corresponds to a 1.2 second period. As the frame counter 204 is increased to its maximum count, the multi-frame counter 206 is incremented.

The base counter 146 may receive a base counter adjustment control signal 150. The base counter adjustment control signal 150 of FIG. 4 is used to synchronize with a base station of the PHS system. Synchronization bias preferably is performed in less than 2 microseconds. The base counter adjustment control signal 150 allows the counters 200-206 to be adjusted to provide proper communication and align the time slots of the personal station with a particular base station.

Figure 6:
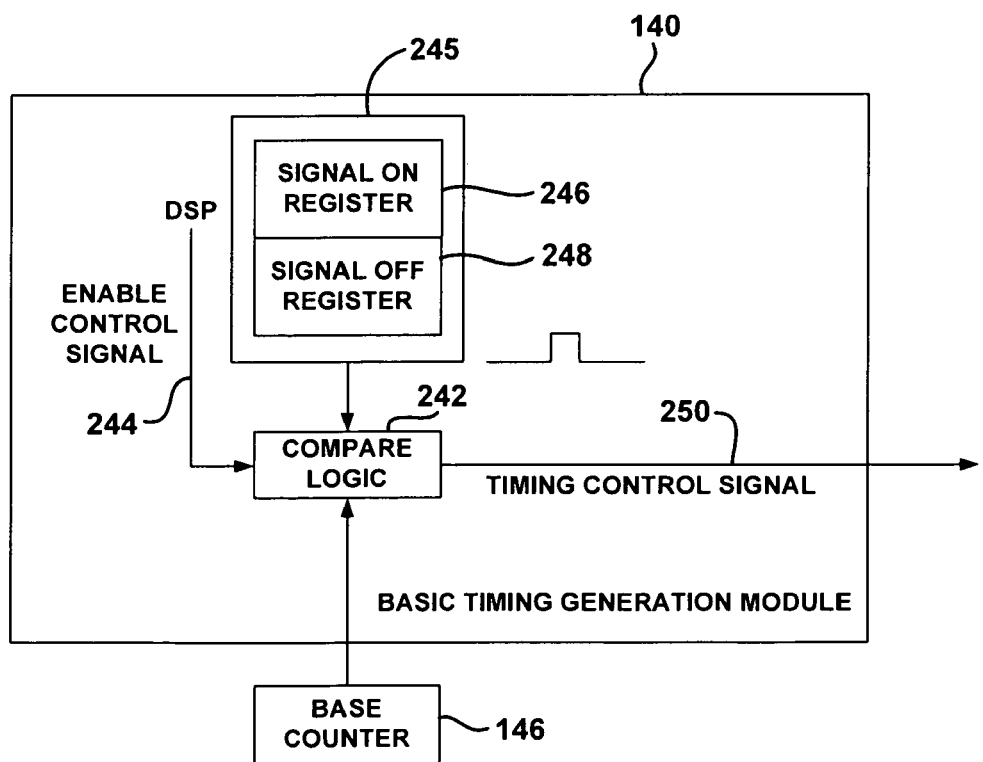
FIG. 6 is a block diagrammatic view of the base timing generation module of FIG. 4.

Referring now to FIG. 6, the basic timing generation module 140 of FIG. 4 is illustrated in further detail. The counter signals from the plurality of counters 200-206 in FIG. 5 are provided as inputs to the basic timing generation module 140 as a frame of reference. Another input to module 140 is the enable control signal 244. The enable control signal 244 is derived from the enable control registers 148 of FIG. 4. At least one of these signals is at an enable level to allow the timing generation module 140 to provide a timing control signal 250 at a level of anything other than off. Ultimately, the enable control registers 148 are controlled by the digital signal processor (DSP) 122 of FIG. 3.

A control signal generator 245 includes a signal-on register 246 and a signal-off register 248 that store respective signal-on value signals and signal-off value signals for controlling certain events in the system. The values within the signal-on register 246 and the signal-off register 248 are controlled by the DSP 122 of FIG. 3 according to system requirements.

Compare logic 242 receives the enable control signal 244 from the digital signal processor 122 of FIG. 3 to allow comparisons to take place. The compare logic 242 compares the frame position output of the counters 200-206 within the base counter 146 to the signal values in the signal-on register 246 and the signal-off register 248. When the values from the counters 200-206 within the base counter 146 match or reach the signal-on register value, the timing control signal is placed at an on level. When the values from the counters 200-206 within the base counter 146 value match or reach the signal-off register value, the timing control signal is placed at an off level.

Once the personal station has been synched with a base station, the signal-on and signal-off registers are configured to obtain the desired timing and generate the desired timing control signal 250. Because the precise timing within a signal is known, the timing control signal may be precisely controlled relative to time to improve the performance of the system. The timing control signal 250 is used by the control signal generation module 132 of FIG. 4 to generate corresponding control signals in the various modules. For example, the transceiver AFE enable control register 152 is used to configure the generation of the transceiver module control signal 174 to communicate with desired time slots.

The control signal generation module 132 generates all module control signals 149 according to the related control registers 150-164. One example of a suitable control is set forth in U.S. application Ser. No. 11/442,838, which was incorporated by reference above. This application describes the bypassing of the carrier recovery module by setting a bit in the control register 152 when the carrier recovery has been accomplished and the data from the signal is being demodulated.

Figure 7:
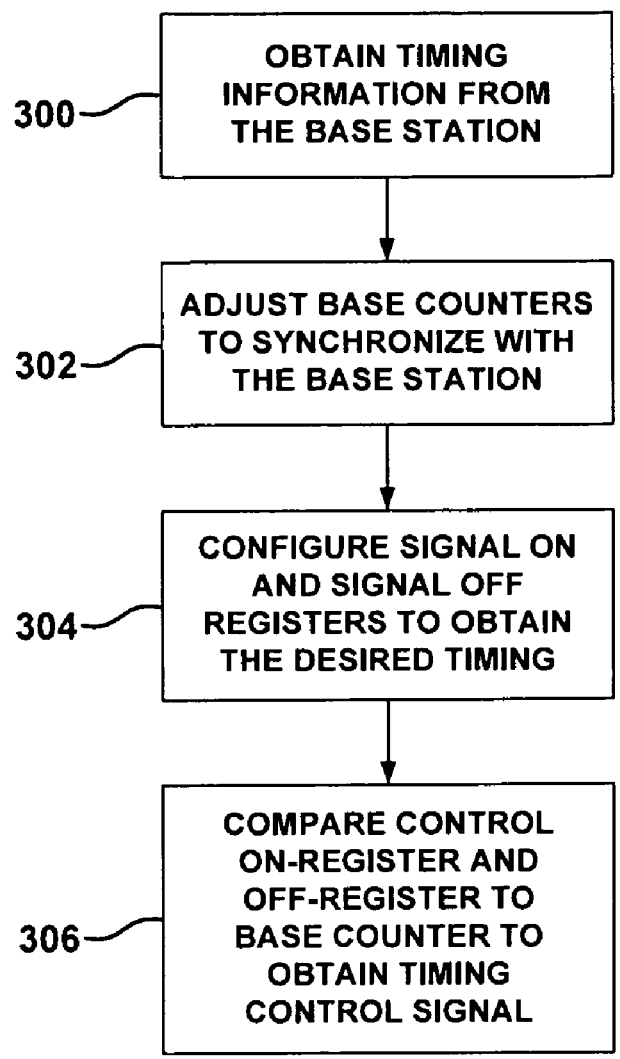
FIG. 7 is a flowchart illustrating a method for synchronizing timing between a base station and a personal station.

Referring now to FIG. 7, a method of adjusting the timing between the base station and the personal station of a PHS system is illustrated. In step 300, the timing information from the base station is obtained at the personal station. In step 302, the counters 200-206 within the base counter 146 are adjusted in the personal station to synchronize with the base station. In step 304, the signal-on and signal-off registers are configured to obtain the desired timing. In step 306, the signal-on register and signal-off register are compared to the base counter values. When the values of the counters 200-206 within the base counter match the signal-on register, the timing control signal is moved to an on level. When the base counter count matches the signal-off register value, the timing control signal is moved to an off level. Because the base counter has high precision, the timing control signal is precisely controlled. This allows the data rate through the system to be increased.

Figure 8:
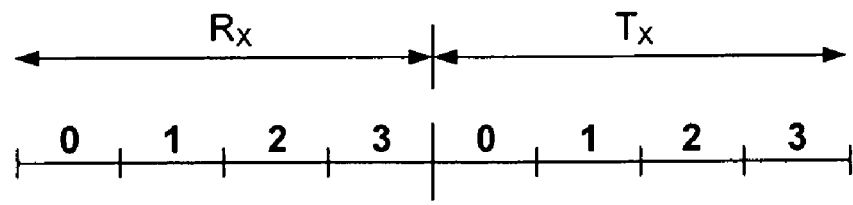
FIG. 8 is a timing diagram for a TDMA system according to the present example.
Figure 8:
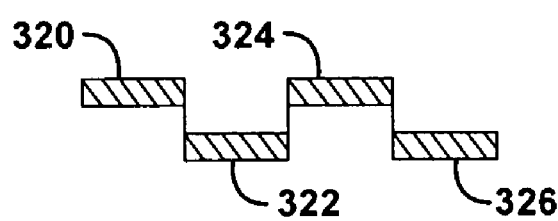

Referring now to FIG. 8, an exemplary embodiment illustrating four transmit timeslots is set forth. The timeslots are labeled 0-3 and the corresponding signals are labeled 320, 322, 324 and 326. Signal 320 corresponds to timeslot 0, signal 322 corresponds to timeslot 1, signal 324 corresponds to timeslot 2 and signal 326 corresponds to timeslot 3. Because of the precise knowledge provided by the base counters, the two registers 246 and 248 of FIG. 6 may be used to precisely control the on and off times of the system.

In previous systems, only signals in non-adjacent slots such as signals 320 and 324 were used. This allowed the system to compensate for a lack of precision in the timing. Because the base counter 146 allows a more precise determination of the timing and associated slots and frames, signals may be used in each of the timeslots. That is, adjacent slots may be used. In the present example, 128 kilobits per second may be provided in the Personal Handy-phone System. This is double the 64 kilobits per second in prior known systems.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A communication system comprising:
a frame position module to generate a frame position signal;
a signal module to generate a signal-on signal and a signal-off signal;
a comparison module to generate a timing control signal based on the frame position signal, the signal-on signal and the signal-off signal; and
a transceiver to:
transmit or receive a first set of data during a first time slot;
select a second time slot that is adjacent to the first time slot based on the timing control signal; and
transmit or receive a second set of data during the second time slot,
wherein the first time slot is associated with a first cell station and the second time slot is associated with a second cell station.

2. The communication system of claim 1, wherein the frame position module comprises a base counter, and the frame position signal comprises a plurality of counter signals.

3. The communication system of claim 2, wherein the plurality of counter signals comprises an intra-slot counter signal.

4. The communication system of claim 2, wherein the plurality of counter signals comprises a slot counter signal.

5. The communication system of claim 2, wherein the plurality of counter signals comprises a frame counter signal.

6. The communication system of claim 2, wherein the plurality of counter signals comprises a multi-frame counter signal.

7. The communication system of claim 2, wherein the plurality of counter signals comprises an intra-slot counter signal, a slot counter signal, a frame counter signal, and a multi-frame counter signal.

8. A personal handy phone system comprising the communication system of claim 1.

9. A time division multiple access system comprising:
a third cell station or a personal station, wherein the third cell station or the personal station comprises the communication system of claim 1;
the first cell station; and
the second cell station.

10. The communication system of claim 1, wherein the signal module includes:
a signal-on register to selectively generate the signal-on signal; and
a signal-off register to selectively generate the signal-off signal.

11. The communication system of claim 1, wherein the comparison module generates the timing control signal by comparing the frame position signal to the signal-on signal and the signal-off signal.

12. The communication system of claim 11, wherein the timing control signal is directed to a first level when the frame position signal matches the signal-on signal, and the timing control signal is directed to a second level when the frame position signal matches the signal-off signal.

13. The communication system of claim 1, further comprising a register that stores a base counter adjustment signal that is based on a timing signal from a base station, wherein the frame position module synchronizes the frame position signal with the base counter adjustment signal.

14. The communication system of claim 1, wherein the signal-on signal corresponds to a first set of register values, and the signal-off signal corresponds to a second set of register values,
  wherein the frame position signal comprises N counter signals, where N is an integer greater than 1,
  wherein the comparison module compares N counter signals to each of the first set of register values and the second set of register values, and
  wherein the comparison module sets the timing control signal to a first level when the N counter signals match the first set of register values, and the comparison module sets the timing control signal to a second level when the N counter signals match the second set of register values.

15. The communication system of claim 14, wherein the N counter signals have N respective counting periods that are distinct from each other.

16. The communication system of claim 14, wherein the N counter signals comprise an intra-slot counter signal, a slot counter signal, a frame counter signal, and a multi-frame counter signal.

17. The communication system of claim 1, wherein:
  the transceiver transmits or receives the first set of data on a first traffic channel of a personal handy-phone system; and
  the transceiver transmits or receives the second set of data on the first traffic channel.

18. The communication system of claim 1, wherein:
  the transceiver transmits or receives the first set of data on a first traffic channel on a personal handy-phone system; and
  the transceiver transmits or receives the second set of data on a second traffic channel on the personal handy-phone system.

19. A method of operating a communication system, the method comprising:
  generating a frame position signal;
  generating a signal-on signal and a signal-off signal;
  generating a timing control signal based on the frame position signal, the signal-on signal and the signal-off signal;
  transmitting or receiving a first set of data during a first time slot;
  selecting a second time slot that is adjacent to the first time slot based on the timing control signal; and
  transmitting or receiving a second set of data during the second time slot,
  wherein the first time slot is associated with a first cell station and the second time slot is associated with a second cell station.

20. The method of claim 19, wherein generating a frame position signal comprises generating a plurality of counter signals.

21. The method of claim 20, wherein generating a plurality of counter signals comprises generating an intra-slot counter signal.

22. The method of claim 20, wherein generating a plurality of counter signals comprises generating a slot counter signal.

23. The method of claim 20, wherein generating a plurality of counter signals comprises generating a frame counter signal.

24. The method of claim 20, wherein generating a plurality of counter signals comprises generating a multi-frame counter signal.

25. The method of claim 20, wherein generating a plurality of counter signals comprises generating an intra-slot counter signal, a slot counter signal, a frame counter signal, and a multi-frame counter signal.

26. The method of claim 19, wherein generating a timing control signal comprises generating the timing control signal by comparing the frame position signal to the signal-on signal and the signal-off signal.

27. The method of claim 19, further comprising directing the timing control signal to an on level when the frame position signal reaches the signal-on signal, and directing the timing control signal to an off level when the frame position signal reaches the signal-off signal.

28. A communication system comprising:
  a frame position means for generating a frame position signal;
  a signal means for generating a signal-on signal and a signal-off signal;
  a comparison means for generating a timing control signal based on the frame position signal, the signal-on signal, and the signal-off signal; and
  a transceiving means for transmitting or receiving a first set of data during a first time slot, for selecting a second time slot that is adjacent to the first time slot based on the timing control signal, and for transmitting or receiving a second set of data during the second time slot,
  wherein the first time slot is associated with a first cell station and the second time slot is associated with a second cell station.

29. The communication system of claim 28, wherein the frame position means comprises base counter means, and the frame position signal comprises a plurality of counter signals.

30. The communication system of claim 29, wherein the plurality of counter signals comprises an intra-slot counter signal.

31. The communication system of claim 29, wherein the plurality of counter signals comprises a slot counter signal.

32. The communication system of claim 29, wherein the plurality of counter signals comprises a frame counter signal.

33. The communication system of claim 29, wherein the plurality of counter signals comprises a multi-frame counter signal.

34. The communication system of claim 29, wherein the plurality of counter signals comprises an intra-slot counter signal, a slot counter signal, a frame counter signal, and a multi-frame counter signal.

35. A personal handy phone system comprising the communication system of claim 28.

36. A time division multiple access system comprising the communication system of claim 28.

37. The communication system of claim 28, wherein the signal means includes:
  signal-on means for selectively generating the signal-on signal; and
  signal-off means for selectively generating the signal-off signal.

38. The communication system of claim 28, wherein the comparison means comprises means for generating the timing control signal by comparing the frame position signal to the signal-on signal and the signal-off signal.

39. The communication system of claim 38, further comprising control means for directing the timing control signal to an on level when the frame position signal reaches the signal-on signal, and for directing the timing control signal to an off level when the frame position signal reaches the signal-off signal.

* * * * *